(12) United States Patent
Syu (10) Patent No.: US 9,612,419 B2
(45) Date of Patent: Apr. 4, 2017

(54) LENS ASSEMBLY

(71) Applicants: Sintai Optical (Shenzhen) Co., Ltd., Shenzhen, Guandong Province (CN); Asia Optical International Ltd., Tortola (GB)

(72) Inventor: Rong-Shun Syu, Taichung (TW)

(73) Assignees: SINTAI OPTICAL (SHENZHEN) CO., LTD., Shenzhen, Guangdong Province (CN); ASIA OPTICAL INTERNATIONAL LTD., Tortola (VG)

(*) Notice: Subject to any disclaimer, the term of this patent is extended or adjusted under 35 U.S.C. 154(b) by 0 days.

(21) Appl. No.: 14/702,820

(22) Filed: May 4, 2015

(65) Prior Publication Data

US 2015/0323768 A1 Nov. 12, 2015

(30) Foreign Application Priority Data

May 9, 2014 (TW) .............................. 103116487 A (51) Int. Cl.
| | | |
|---|---|---|
| *G02B 9/60* | (2006.01) | |
| *G02B 13/00* | (2006.01) | |
| *G03B 19/12* | (2006.01) | |
| *G02B 15/14* | (2006.01) | |

(52) U.S. Cl.
CPC ........... *G02B 9/60* (2013.01); *G02B 13/0045* (2013.01); *G02B 15/14* (2013.01); *G03B 19/12* (2013.01)

(58) Field of Classification Search
CPC ... G02B 9/60; G02B 9/62; G02B 9/64; G02B 13/0045; G02B 13/005; G02B 15/14; G02B 15/177; G03B 19/12

USPC ......... 359/754–757, 761–763, 770, 713–714
See application file for complete search history.

(56) References Cited

U.S. PATENT DOCUMENTS

| | | | | | |
|---|---|---|---|---|---|
| 4,311,367 | A | * | 1/1982 | Mori | G02B 13/04 359/749 |
| 4,772,108 | A | * | 9/1988 | Sugiyama | G02B 9/62 359/761 |
| 5,523,888 | A | * | 6/1996 | Nishio | G02B 15/177 359/686 |
| 5,880,879 | A | * | 3/1999 | Foo | G02B 27/0037 359/356 |
| 6,038,085 | A | * | 3/2000 | Nakazawa | G02B 9/12 359/753 |

(Continued)

FOREIGN PATENT DOCUMENTS

JP       2004318098 A       11/2004

*Primary Examiner* — Jordan Schwartz
(74) *Attorney, Agent, or Firm* — McClure, Qualey & Rodack, LLP (57) ABSTRACT

A lens assembly includes a first lens group, a stop and a second lens group, all of which are arranged in sequence from an object side to an image side along an optical axis. The first lens group includes a first lens and a second lens, wherein the first lens is with negative refractive power and the second lens is with positive refractive power. The second lens group includes a third lens, a fourth lens, a fifth lens and a sixth lens, wherein the third lens and the fifth lens are with negative refractive power, and the fourth lens and the sixth lens are with positive refractive power. The lens assembly satisfies $0.23 \leq f/TL \leq 0.45$, wherein f is an effective focal length of the lens assembly and TL is a distance from an object side surface of the first lens to an image plane along the optical axis.

6 Claims, 12 Drawing Sheets

(56) References Cited

U.S. PATENT DOCUMENTS

| | | | | |
|---|---|---|---|---|
| 2005/0014218 | A1* | 1/2005 | Hagimori | G02B 7/102 435/40.5 |
| 2012/0063011 | A1* | 3/2012 | Suzuki | G02B 13/06 359/753 |
| 2013/0033763 | A1* | 2/2013 | Sunaga | G02B 9/62 359/713 |
| 2013/0162886 | A1* | 6/2013 | Morooka | G02B 15/163 348/345 |
| 2014/0055558 | A1* | 2/2014 | Souma | H04N 5/23238 348/36 |
| 2014/0184882 | A1* | 7/2014 | Kuzuhara | G02B 15/177 348/345 |
| 2014/0307333 | A1* | 10/2014 | Kawamura | G02B 13/0045 359/708 |
| 2015/0043078 | A1* | 2/2015 | Suzuki | G02B 15/173 359/576 |

\* cited by examiner

LENS ASSEMBLY

BACKGROUND OF THE INVENTION

Field of the Invention

The invention relates to a lens assembly.

Description of the Related Art

Consumer digital still cameras have been gradually developed toward miniaturization. Therefore, digital single-lens reflex cameras with interchangeable lenses also need to be miniaturized. The volume of known digital single-lens reflex camera is relatively large and can't satisfy requirement of present. Therefore, a lens assembly for the digital single-lens reflex camera needs a new structure in order to meet the requirements of miniaturization, small F-number and high resolution.

BRIEF SUMMARY OF THE INVENTION

The invention provides a lens assembly to solve the above problems. The lens assembly of the invention is provided with characteristics of a shortened total lens length, a smaller F-number, a high resolution and still has a good optical performance.

The lens assembly in accordance with an exemplary embodiment of the invention includes a first lens group, a stop and a second lens group, all of which are arranged in sequence from an object side to an image side along an optical axis. The first lens group includes a first lens and a second lens, all of which are arranged in sequence from the object side to the image side along the optical axis, wherein the first lens is with negative refractive power and the second lens is with positive refractive power. The second lens group includes a third lens, a fourth lens, a fifth lens and a sixth lens, all of which are arranged in sequence from the object side to the image side along the optical axis, wherein the third lens is with negative refractive power and includes a concave surface facing the object side, the fourth lens is with positive refractive power, the fifth lens is with negative refractive power and the sixth lens is with positive refractive power. The lens assembly satisfies $0.23 \leq f/TL \leq 0.45$, wherein f is an effective focal length of the lens assembly and TL is a distance from an object side surface of the first lens to an image plane along the optical axis.

In another exemplary embodiment, the first lens group satisfies $|f/f_1| \leq 1$, wherein f is an effective focal length of the lens assembly and $f_1$ is an effective focal length of the first lens group.

In yet another exemplary embodiment, the second lens group satisfies $|(f_2-f)/f| \leq 0.093$, wherein $f_2$ is an effective focal length of the second lens group and f is an effective focal length of the lens assembly.

In another exemplary embodiment, the first lens group and the second lens group satisfy $0.04 \leq |f_2/f_1| \leq 1$, wherein $f_1$ is an effective focal length of the first lens group and $f_2$ is an effective focal length of the second lens group.

In yet another exemplary embodiment, the first lens group at least includes an aspheric lens and the second lens group at least includes an aspheric lens.

In another exemplary embodiment, the second lens group at least includes two convex lenses.

In yet another exemplary embodiment, the second lens group moves along the optical axis when the lens assembly is focusing at close distance.

In another exemplary embodiment, the fifth lens and the sixth lens move along the optical axis together when the lens assembly is focusing at close distance.

The lens assembly in accordance with an another exemplary embodiment of the invention includes a first lens group, a stop and a second lens group, all of which are arranged in sequence from an object side to an image side along an optical axis. The first lens group consists of a first lens, wherein the first lens is with negative refractive power. The second lens group includes a third lens, a fourth lens, a fifth lens and a sixth lens, all of which are arranged in sequence from the object side to the image side along the optical axis, wherein the third lens is with negative refractive power and includes a concave surface facing the object side, the fourth lens is with positive refractive power, the fifth lens is with negative refractive power and the sixth lens is with positive refractive power. The lens assembly satisfies $0.23 \leq f/TL \leq 0.45$, wherein f is an effective focal length of the lens assembly and TL is a distance from an object side surface of the first lens to an image plane along the optical axis.

In another exemplary embodiment, the first lens group satisfies $|f/f_1| \leq 1$, wherein f is an effective focal length of the lens assembly and $f_1$ is an effective focal length of the first lens group.

In yet another exemplary embodiment, the second lens group satisfies $|(f_2-f)/f| \leq 0.093$, wherein $f_2$ is an effective focal length of the second lens group and f is an effective focal length of the lens assembly.

In another exemplary embodiment, the first lens group and the second lens group satisfy $0.04 \leq |f_2/f_1| \leq 1$, wherein $f_1$ is an effective focal length of the first lens group and $f_2$ is an effective focal length of the second lens group.

In yet another exemplary embodiment, the first lens is an aspheric lens and the second lens group at least includes an aspheric lens.

In another exemplary embodiment, the second lens group at least includes two convex lenses.

In yet another exemplary embodiment, the second lens group moves along the optical axis when the lens assembly is focusing at close distance.

In another exemplary embodiment, the fifth lens and the sixth lens move along the optical axis together when the lens assembly is focusing at close distance.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
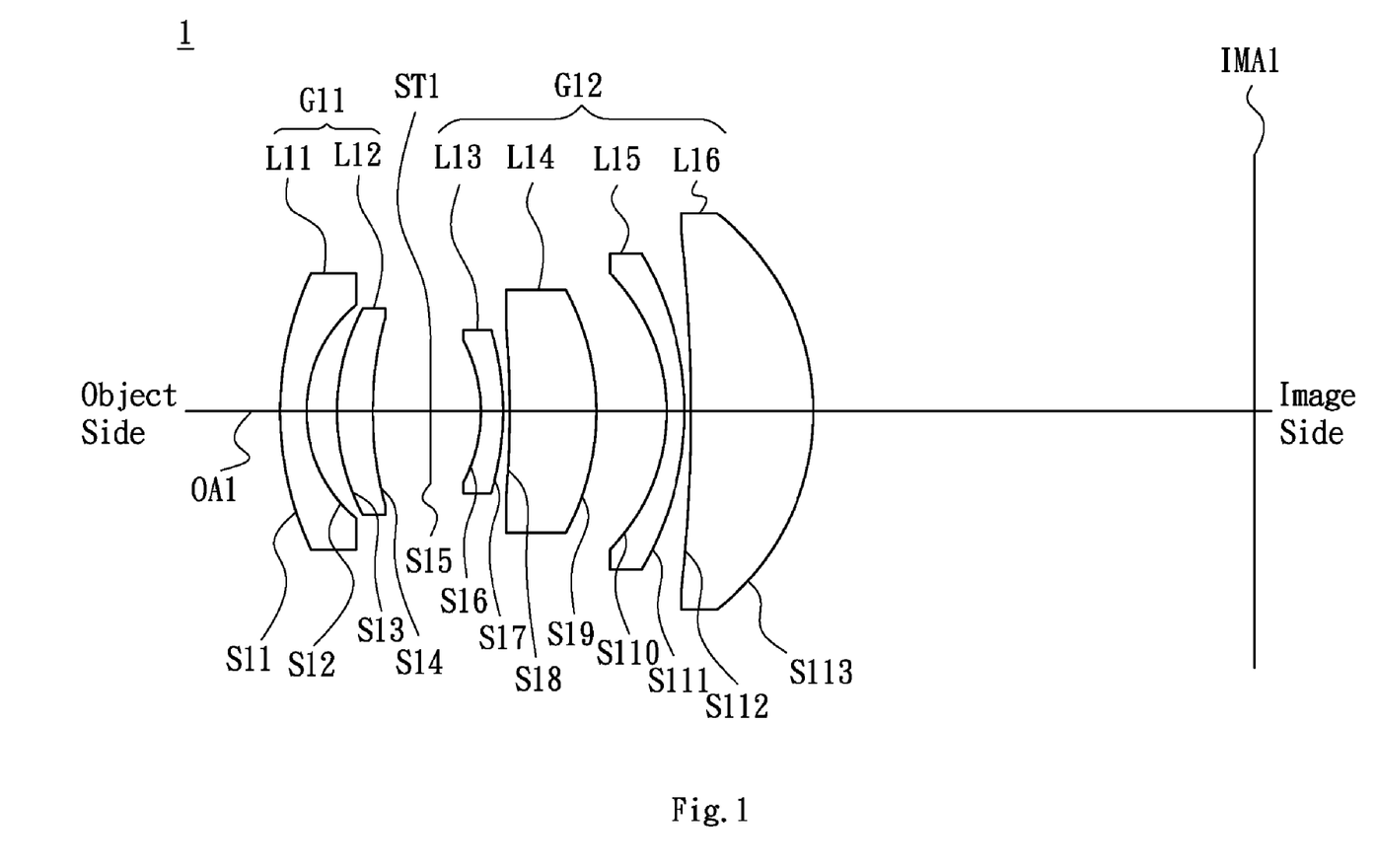
FIG. 1 is a lens layout of a lens assembly in accordance with a first embodiment of the invention.

Referring to FIG. 1, FIG. 1 is a lens layout of a lens assembly in accordance with a first embodiment of the invention. The lens assembly 1 includes a first lens group G11, a stop ST1 and a second lens group G12, all of which are arranged in sequence from an object side to an image side along an optical axis OA1. In operation, an image of light rays from the object side is formed on an image plane IMA1. The first lens group G11 includes a first lens L11 and a second lens L12, all of which are arranged in sequence from the object side to the image side along the optical axis OA1. The first lens L11 is a meniscus lens with negative refractive power and includes a convex surface S11 facing the object side and a concave surface S12 facing the image side, wherein the convex surface S11 is a spherical surface and the concave surface S12 is an aspheric surface. The second lens L12 is a meniscus lens with positive refractive power and includes a convex surface S13 facing the object side and a concave surface S14 facing the image side, wherein both of the convex surface S13 and concave surface S14 are spherical surfaces. The second lens group G12 includes a third lens L13, a fourth lens L14, a fifth lens L15 and a sixth lens L16, all of which are arranged in sequence from the object side to the image side along the optical axis OA1. The third lens L13 is a meniscus lens with negative refractive power and includes a concave surface S16 facing the object side and a convex surface S17 facing the image side, wherein the concave surface S16 is a spherical surface and the convex surface S17 is an aspheric surface. The fourth lens L14 is a meniscus lens with positive refractive power and includes a concave surface S18 facing the object side and a convex surface S19 facing the image side, wherein both of the concave surface S18 and convex surface S19 are spherical surfaces. The fifth lens L15 is a meniscus lens with negative refractive power and includes a concave surface S110 facing the object side and a convex surface S111 facing the image side, wherein both of the concave surface S110 and convex surface S111 are spherical surfaces. The sixth lens L16 is a meniscus lens with positive refractive power and includes a concave surface S112 facing the object side and a convex surface S113 facing the image side, wherein both of the concave surface S112 and convex surface S113 are aspheric surfaces. The fifth lens L15 and the sixth lens L16 move along the optical axis OA1 together when the lens assembly 1 is focusing at close distance.

In order to maintain excellent optical performance of the lens assembly in accordance with the first embodiment of the invention, the lens assembly 1 must satisfies the following four conditions:

$$0.23 \leq f1/TL1 \leq 0.45 \quad (1)$$

$$|f1/f1_1| \leq 1 \quad (2)$$

$$|(f1_2-f1)/f1| \leq 0.093 \quad (3)$$

$$0.04 \leq |f1_2/f1_1| \leq 1 \quad (4)$$

wherein f1 is an effective focal length of the lens assembly 1, TL1 is a distance from the object side surface S11 of the first lens L11 to the image plane IMA1 along the optical axis OA1, $f1_1$ is an effective focal length of the first lens group G11 and $f1_2$ is an effective focal length of the second lens group G12.

By the above design of the lenses and stop ST1, the lens assembly 1 is provided with a shortened total lens length, a reduced F-number, an effective corrected aberration and an increased resolution.

In order to achieve the above purposes and effectively enhance the optical performance, the lens assembly 1 in accordance with the first embodiment of the invention is provided with the optical specifications shown in Table 1, which include the effective focal length, F-number, total lens length, radius of curvature of each lens surface, thickness between adjacent surface, refractive index of each lens and Abbe number of each lens. Table 1 shows that the effective focal length is equal to 14.3 mm, F-number is equal to 2.45 and total lens length is equal to 43.96 mm for the lens assembly 1 of the first embodiment of the invention.

TABLE 1

| Effective Focal Length = 14.3 mm F-number = 2.45 Total Lens Length = 43.96 mm | | | | | |
|---|---|---|---|---|---|
| Surface Number | Radius of Curvature (mm) | Thickness (mm) | Nd | Vd | Remark |
| S11 | 14.314 | 1.191 | 1.55 | 95 | The First Lens L11 |
| S12 | 5.695 | 1.401 | | | |
| S13 | 9.946 | 1.568 | 1.83 | 35.3 | The Second Lens L12 |
| S14 | 15.921 | 2.593 | | | |
| S15 | ∞ | 2.311 | | | Stop ST1 |
| S16 | −7.341 | 0.99 | 1.91 | 29.1 | The Third Lens L13 |
| S17 | −11.703 | 0.292 | | | |
| S18 | −60.048 | 3.892 | 1.95 | 45 | The Fourth Lens L14 |
| S19 | −11.539 | 3.208 | | | |
| S110 | −8.661 | 0.797 | 1.71 | 17 | The Fifth Lens L15 |
| S111 | −13.517 | 0.299 | | | |
| S112 | −186.849 | 5.652 | 1.55 | 87 | The Sixth Lens L16 |
| S113 | −9.395 | 19.77 | | | |

The aspheric surface sag z of each lens in table 1 can be calculated by the following formula:

$$z = ch^2/\{1+[1-(k+1)c^2h^2]^{1/2}\}+Ah^4+Bh^6+Ch^8+Dh^{10}+Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D, E of each surface are shown in Table 2.

TABLE 2

| Surface Number | k | A | B | C | D | E |
|---|---|---|---|---|---|---|
| S12 | −0.924 | 3.62E−04 | 2.199E−06 | 8.653E−08 | −1.538E−09 | −1.146E−11 |
| S17 | 0 | −2.705E−05 | −5.93E−08 | −1.315E−07 | 4.077E−09 | 0 |
| S112 | 0 | −7.183E−05 | 4.125E−07 | −4.786E−09 | 4.825E−11 | −3.611E−13 |
| S113 | −0.244 | 7.724E−05 | 1.766E−07 | 4.445E−09 | −2.416E−11 | 3.417E−13 |

For the lens assembly 1 of the first embodiment, the effective focal length f1 of the lens assembly 1 is equal to 14.3 mm, the distance TL1 from the object side surface S11 of the first lens L11 to the image plane IMA1 along the optical axis OA1 is equal to 43.96 mm, the effective focal length $f1_1$ of the first lens group G11 is equal to −47.38 mm, and the effective focal length $f1_2$ of the second lens group G12 is equal to 14.5 mm. According to the above data, the following values can be obtained:

$$f1/TL1=0.36,$$

$$|f1/f1_1|=0.30,$$

$$|(f1_2-f1)/f1|=0.014,$$

$$|f1_2/f1_1|=0.31$$

which respectively satisfy the above conditions (1)-(4).

Figure 2A:
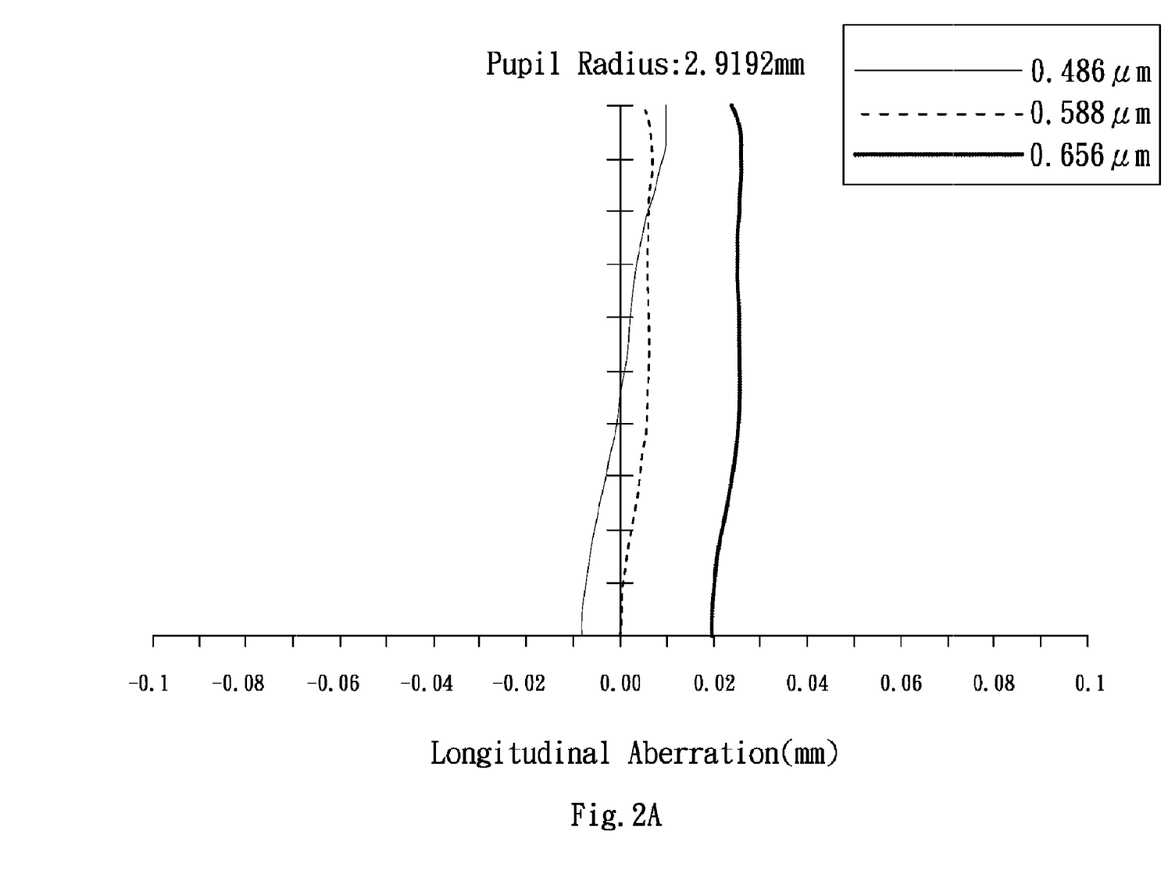
FIG. 2A depicts a longitudinal aberration diagram of the lens assembly in accordance with the first embodiment of the invention.
Figure 2B:
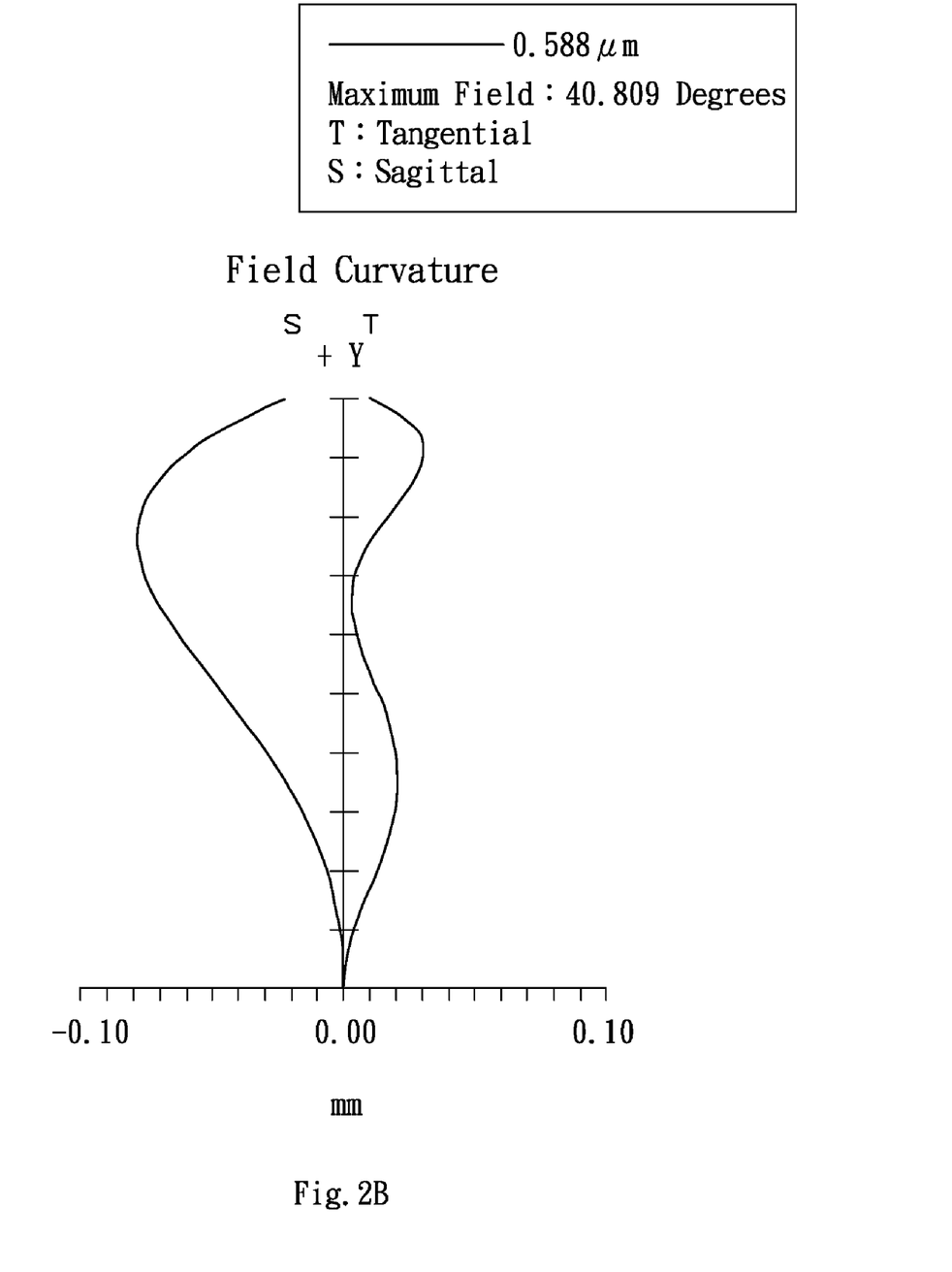
FIG. 2B is a field curvature diagram of the lens assembly in accordance with the first embodiment of the invention.
Figure 2C:
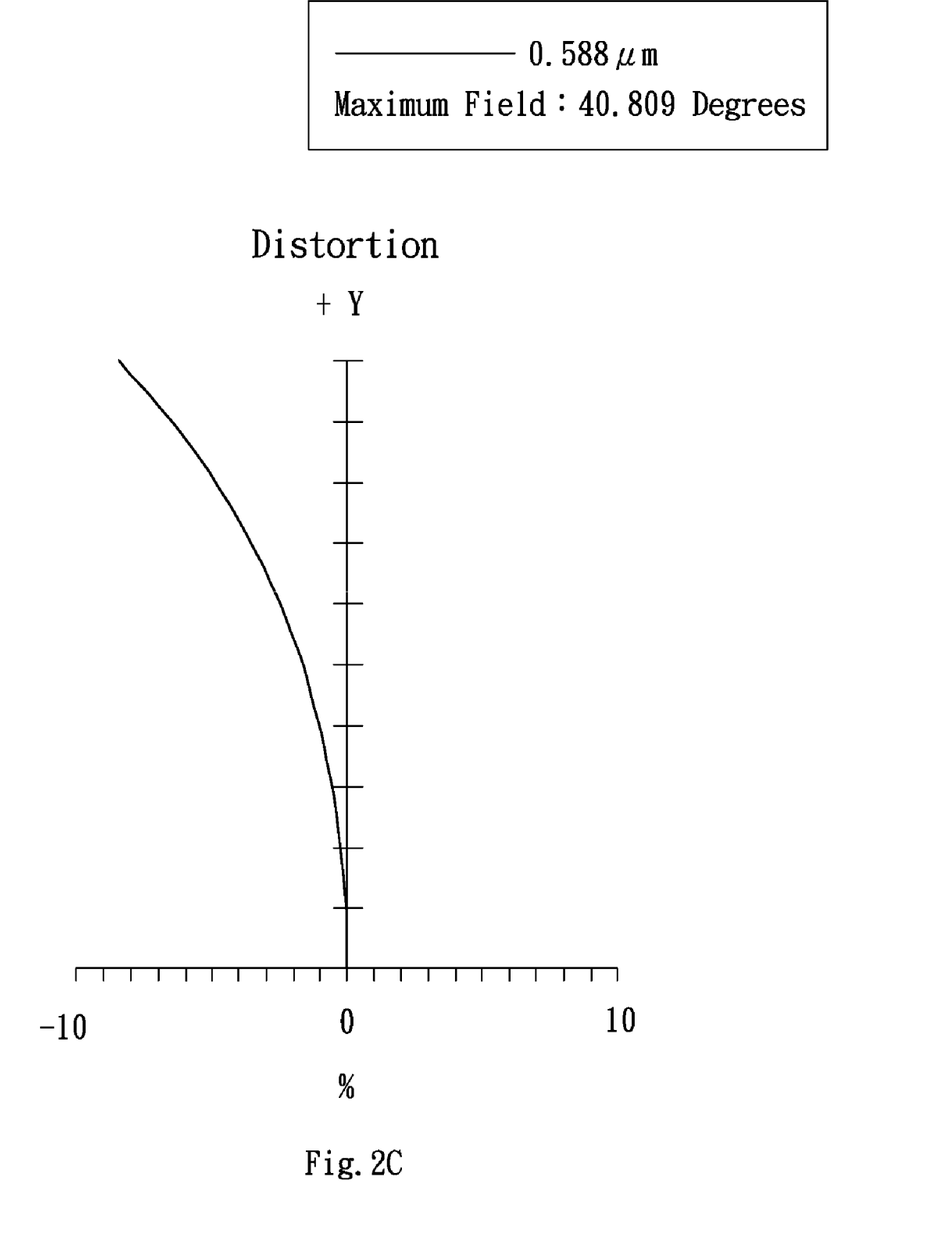
FIG. 2C is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a longitudinal aberration diagram of the lens assembly 1 in accordance with the first embodiment of the invention, FIG. 2B shows a field curvature diagram of the lens assembly 1 in accordance with the first embodiment of the invention and FIG. 2C shows a distortion diagram of the lens assembly 1 in accordance with the first embodiment of the invention.

It can be seen from FIG. 2A that the longitudinal aberration in the lens assembly 1 of the first embodiment ranges between −0.01 mm and 0.03 mm for the wavelength of 0.486 μm, 0.588 μm and 0.656 μm. It can be seen from FIG. 2B that the field curvature of tangential direction and sagittal direction in the lens assembly 1 of the first embodiment ranges between −0.08 mm and 0.04 mm for the wavelength of 0.588 μm. It can be seen from FIG. 2C that the distortion in the lens assembly 1 of the first embodiment ranges between −9% and 0% for the wavelength of 0.588 μm. It is obvious that the longitudinal aberration, the field curvature and the distortion of the lens assembly 1 of the first embodiment can be corrected effectively. Therefore, the lens assembly 1 of the first embodiment is capable of good optical performance.

Figure 3:
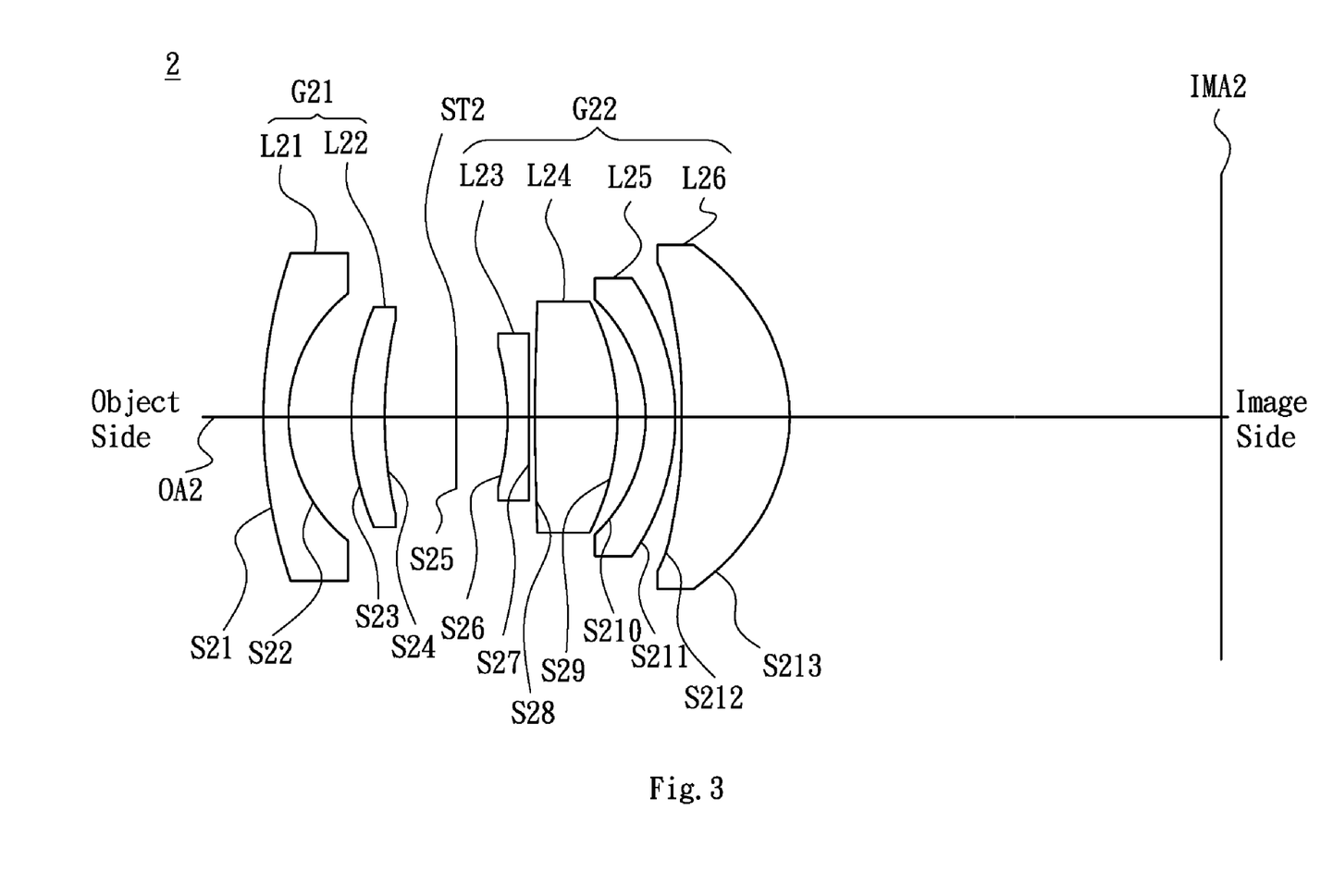
FIG. 3 is a lens layout of a lens assembly in accordance with a second embodiment of the invention.

Referring to FIG. 3, FIG. 3 is a lens layout of a lens assembly in accordance with a second embodiment of the invention. The lens assembly 2 includes a first lens group G21, a stop ST2 and a second lens group G22, all of which are arranged in sequence from an object side to an image side along an optical axis OA2. In operation, an image of light rays from the object side is formed on an image plane IMA2. The first lens group G21 includes a first lens L21 and a second lens L22, all of which are arranged in sequence from the object side to the image side along the optical axis OA2. The first lens L21 is a meniscus lens with negative refractive power and includes a convex surface S21 facing the object side and a concave surface S22 facing the image side, wherein the convex surface S21 is a spherical surface and the concave surface S22 is an aspheric surface. The second lens L22 is a meniscus lens with positive refractive power and includes a convex surface S23 facing the object side and a concave surface S24 facing the image side, wherein both of the convex surface S23 and concave surface S24 are spherical surfaces. The second lens group G22 includes a third lens L23, a fourth lens L24, a fifth lens L25 and a sixth lens L26, all of which are arranged in sequence from the object side to the image side along the optical axis OA2. The third lens L23 is a biconcave lens with negative refractive power and includes a concave surface S26 facing the object side and a concave surface S27 facing the image side, wherein the concave surface S26 is an aspheric surface and the concave surface S27 is a spherical surface. The fourth lens L24 is a biconvex lens with positive refractive power and includes a convex surface S28 facing the object side and a convex surface S29 facing the image side, wherein both of the convex surface S28 and convex surface S29 are spherical surfaces. The fifth lens L25 is a meniscus lens with negative refractive power and includes a concave surface S210 facing the object side and a convex surface S211 facing the image side, wherein both of the concave surface S210 and convex surface S211 are spherical surfaces. The sixth lens L26 is a meniscus lens with positive refractive power and includes a concave surface S212 facing the object side and a convex surface S213 facing the image side, wherein both of the concave surface S212 and convex surface S213 are aspheric surfaces. The second lens group G22 moves along the optical axis OA2 when the lens assembly 2 is focusing at close distance.

In order to maintain excellent optical performance of the lens assembly in accordance with the second embodiment of the invention, the lens assembly 2 must satisfies the following four conditions:

$$0.23 \leq f2/TL2 \leq 0.45 \qquad (5)$$

$$|f2/f2_1| \leq 1 \qquad (6)$$

$$|(f2_2-f2)/f2| \leq 0.093 \qquad (7)$$

$$0.04 \leq |f2_2/f2_1| \leq 1 \qquad (8)$$

wherein f2 is an effective focal length of the lens assembly 2, TL2 is a distance from the object side surface S21 of the first lens L21 to the image plane IMA2 along the optical axis OA2, $f2_1$ is an effective focal length of the first lens group G21 and $f2_2$ is an effective focal length of the second lens group G22.

By the above design of the lenses and stop ST2, the lens assembly 2 is provided with a shortened total lens length, a reduced F-number, an effective corrected aberration and an increased resolution.

In order to achieve the above purposes and effectively enhance the optical performance, the lens assembly 2 in accordance with the second embodiment of the invention is provided with the optical specifications shown in Table 3, which include the effective focal length, F-number, total lens length, radius of curvature of each lens surface, thickness between adjacent surface, refractive index of each lens and Abbe number of each lens. Table 3 shows that the effective focal length is equal to 14.31 mm, F-number is equal to 2.45 and total lens length is equal to 44.88 mm for the lens assembly 2 of the second embodiment of the invention.

TABLE 3

Effective Focal Length = 14.31 mm
F-number = 2.45
Total Lens Length = 44.88 mm

| Surface Number | Radius of Curvature (mm) | Thickness (mm) | Nd | Vd | Remark |
|---|---|---|---|---|---|
| S21 | 24.231 | 1.186 | 1.42 | 95 | The First Lens L21 |
| S22 | 6.937 | 2.949 | | | |
| S23 | 13.103 | 1.531 | 1.93 | 25.5 | The Second Lens L22 |
| S24 | 21.037 | 3.326 | | | |
| S25 | ∞ | 2.453 | | | Stop ST2 |
| S26 | −13.204 | 0.984 | 1.73 | 21.1 | The Third Lens L23 |
| S27 | 946.675 | 0.268 | | | |
| S28 | 65.268 | 3.886 | 1.92 | 32.7 | The Fourth Lens L24 |
| S29 | −11.9 | 1.377 | | | |
| S210 | −7.528 | 1.35 | 1.85 | 18 | The Fifth Lens L25 |
| S211 | −11.376 | 0.298 | | | |
| S212 | −33.001 | 5.046 | 1.55 | 95 | The Sixth Lens L26 |
| S213 | −8.53 | 20.228 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the second embodiment, the conic constant k and the aspheric coefficients A, B, C, D, E of each surface are shown in Table 4.

TABLE 4

| Surface Number | k | A | B | C | D | E |
|---|---|---|---|---|---|---|
| S22 | −0.747 | 1.159E−04 | 3.424E−07 | 1.676E−08 | −7.124E−08 | −1.838E−12 |
| S26 | 0 | −1.285E−04 | 1.061E−08 | −3.409E−08 | 1.263E−09 | 0 |
| S212 | 0 | −6.106E−05 | −3.633E−07 | −2.844E−09 | −6.295E−11 | −1.212E−14 |
| S213 | −0.235 | 7.658E−05 | 8.896E−09 | 5.568E−09 | −1.874E−11 | −9.4E−14 |

For the lens assembly 2 of the second embodiment, the effective focal length f2 of the lens assembly 2 is equal to 14.31 mm, the distance TL2 from the object side surface S21 of the first lens L21 to the image plane IMA2 along the optical axis OA2 is equal to 44.88 mm, the effective focal length $f2_1$ of the first lens group G21 is equal to −85 mm, and the effective focal length $f2_2$ of the second lens group G22 is equal to 15.4 mm. According to the above data, the following values can be obtained:

$f2/TL2 = 0.32$, $|f2/f2_1| = 0.17$, $|(f2_2-f2)/f2| = 0.076$, $|f2_2/f2_1| = 0.18$ which respectively satisfy the above conditions (5)-(8).

Figure 4A:
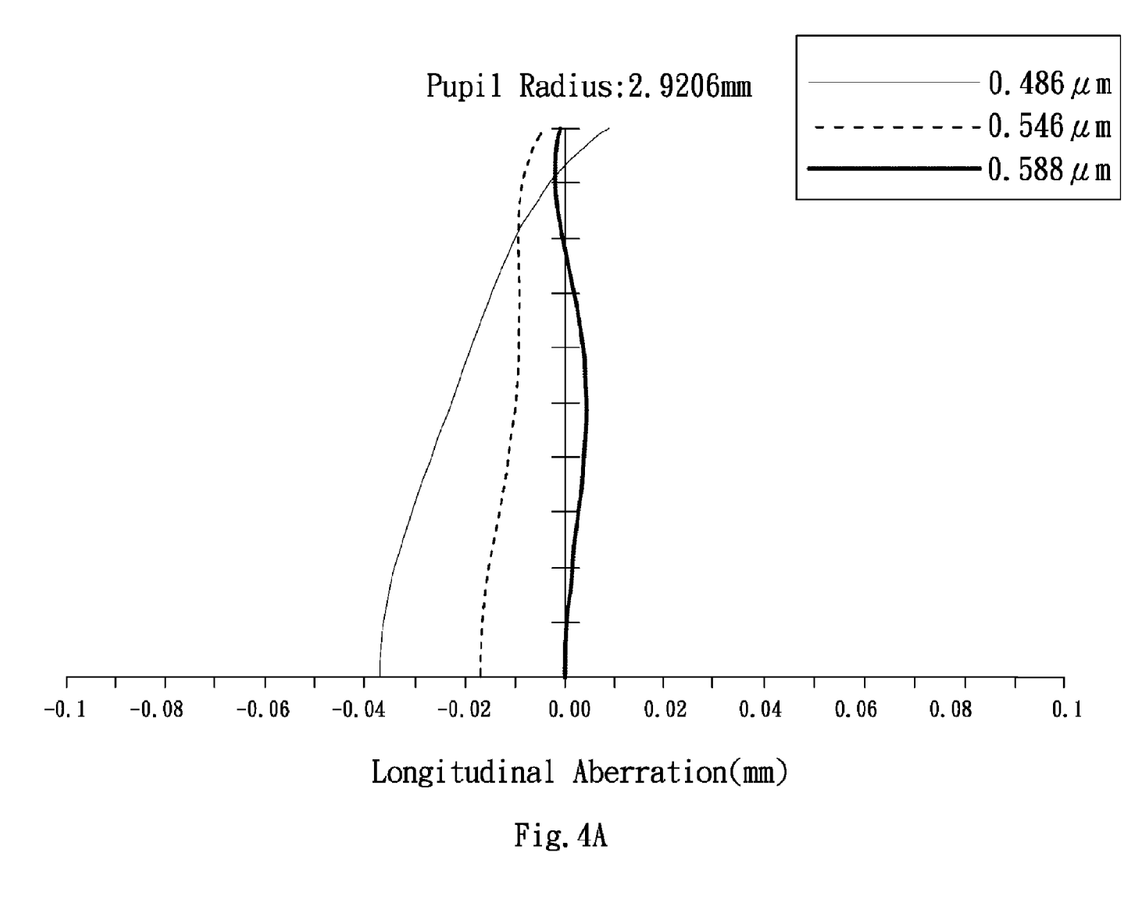
FIG. 4A depicts a longitudinal aberration diagram of the lens assembly in accordance with the second embodiment of the invention.
Figure 4B:
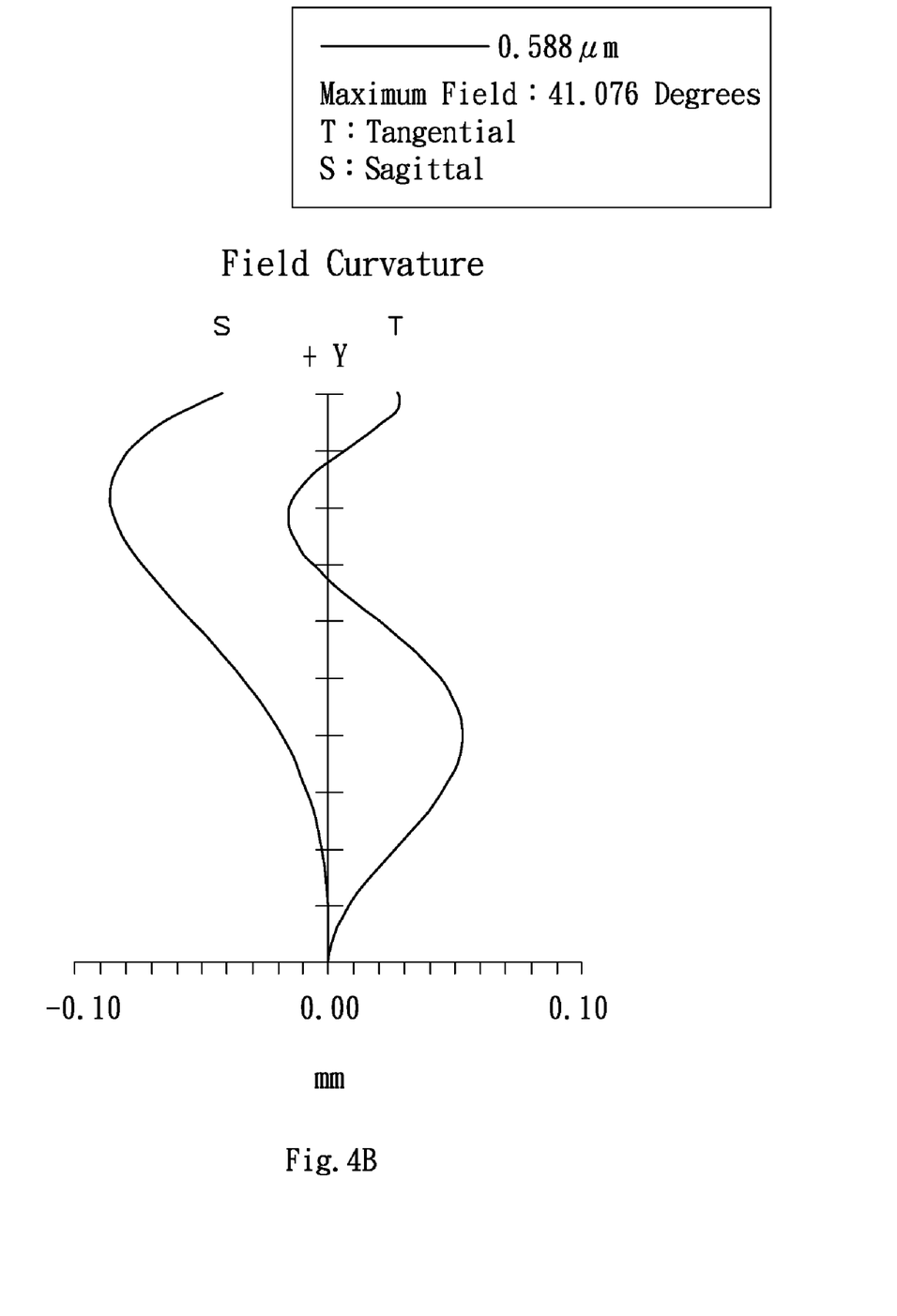
FIG. 4B is a field curvature diagram of the lens assembly in accordance with the second embodiment of the invention.
Figure 4C:
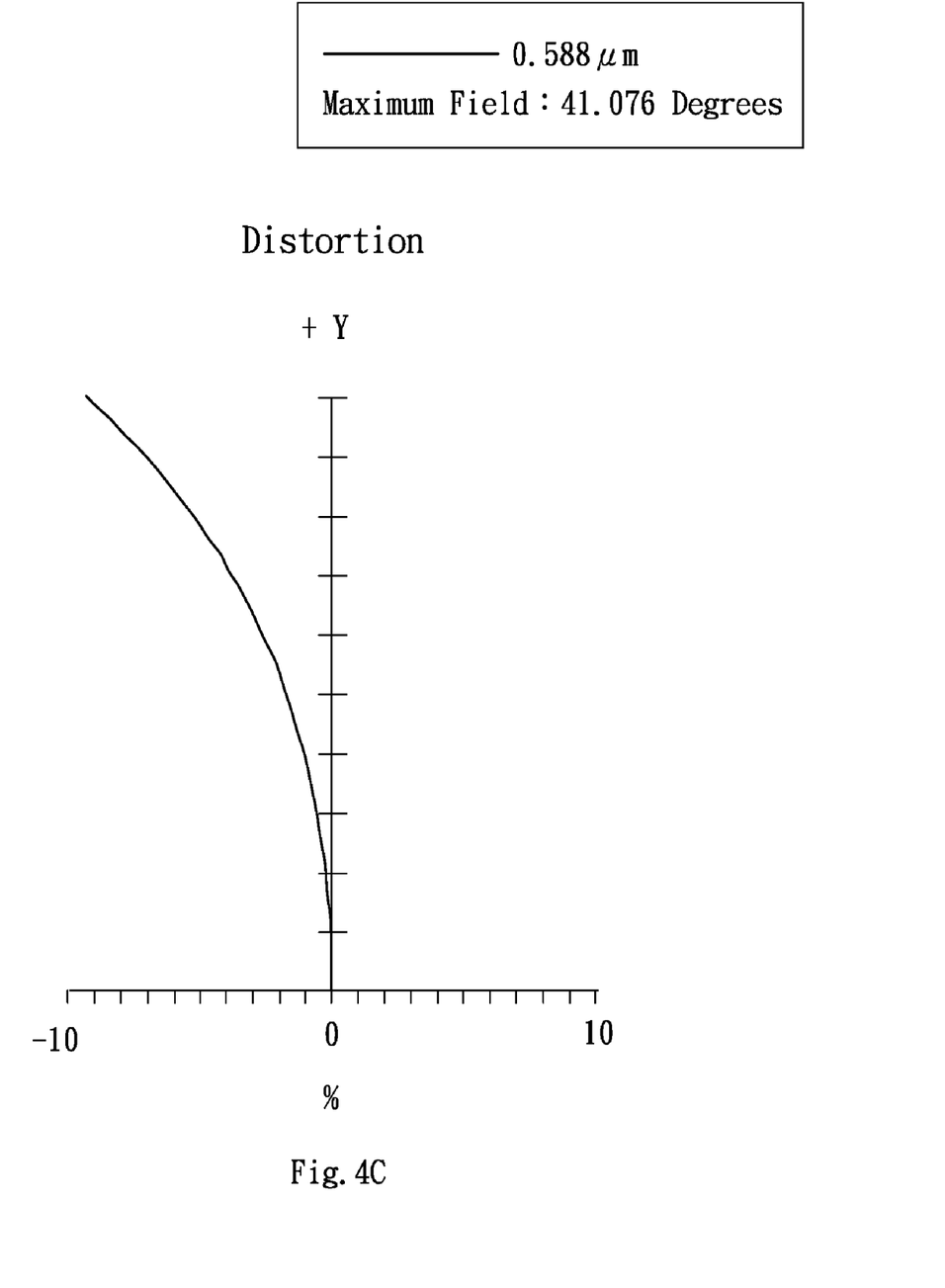
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a longitudinal aberration diagram of the lens assembly 2 in accordance with the second embodiment of the invention, FIG. 4B shows a field curvature diagram of the lens assembly 2 in accordance with the second embodiment of the invention and FIG. 4C shows a distortion diagram of the lens assembly 2 in accordance with the second embodiment of the invention.

It can be seen from FIG. 4A that the longitudinal aberration in the lens assembly 2 of the second embodiment ranges between −0.04 mm and 0.01 mm for the wavelength of 0.486 μm, 0.546 μm and 0.588 μm. It can be seen from FIG. 4B that the field curvature of tangential direction and sagittal direction in the lens assembly 2 of the second embodiment ranges between −0.09 mm and 0.06 mm for the wavelength of 0.588 μm. It can be seen from FIG. 4C that the distortion in the lens assembly 2 of the second embodiment ranges between −10% and 0% for the wavelength of 0.588 μm. It is obvious that the longitudinal aberration, the field curvature and the distortion of the lens assembly 2 of the second embodiment can be corrected effectively. Therefore, the lens assembly 2 of the second embodiment is capable of good optical performance.

Figure 5:
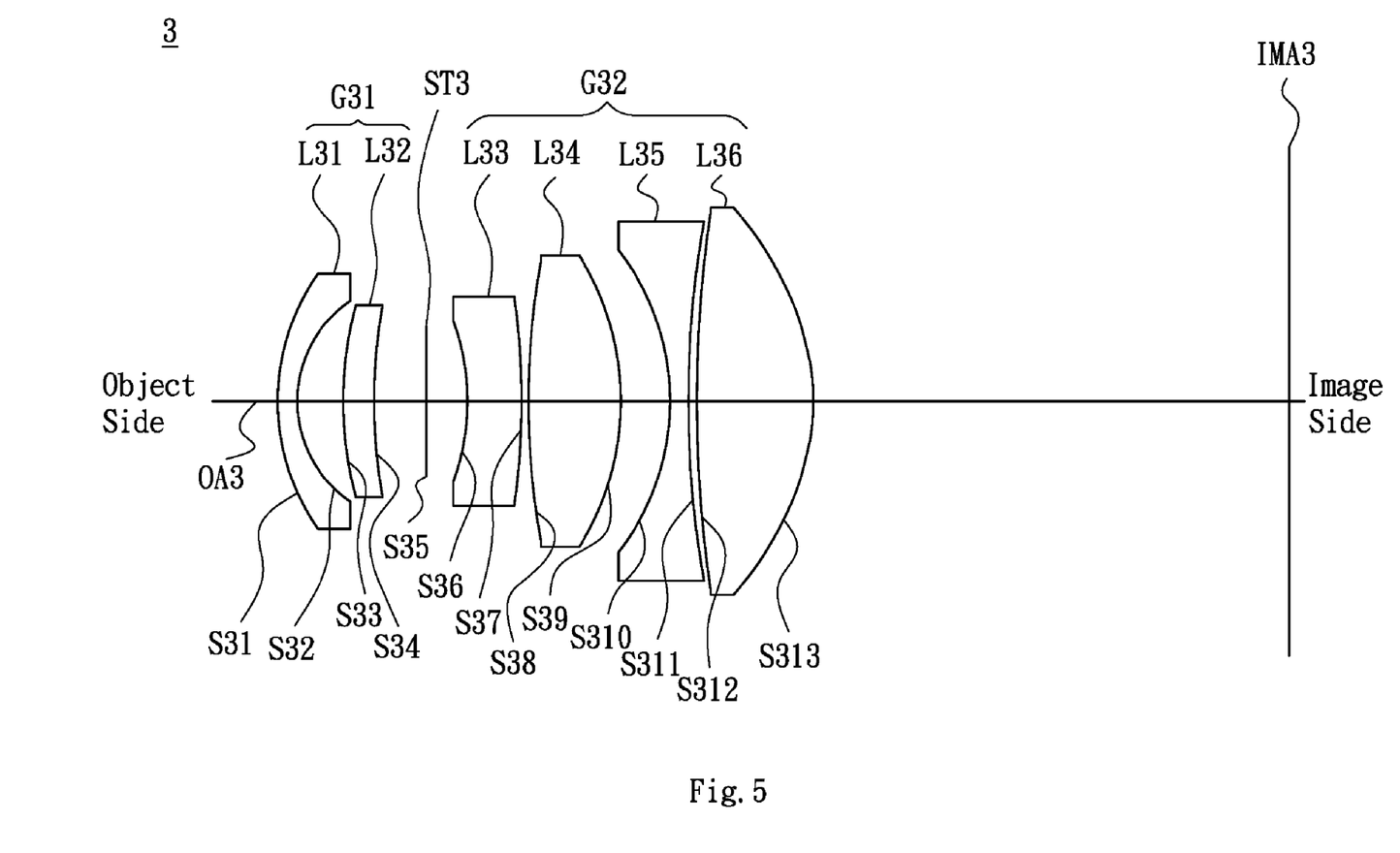
FIG. 5 is a lens layout of a lens assembly in accordance with a third embodiment of the invention.

Referring to FIG. 5, FIG. 5 is a lens layout of a lens assembly in accordance with a third embodiment of the invention. The lens assembly 3 includes a first lens group G31, a stop ST3 and a second lens group G32, all of which are arranged in sequence from an object side to an image side along an optical axis OA3. In operation, an image of light rays from the object side is formed on an image plane IMA3. The first lens group G31 includes a first lens L31 and a second lens L32, all of which are arranged in sequence from the object side to the image side along the optical axis OA3. The first lens L31 is a meniscus lens with negative refractive power and includes a convex surface S31 facing the object side and a concave surface S32 facing the image side, wherein both of the convex surface S31 and concave surface S32 are aspheric surfaces. The second lens L32 is a meniscus lens with positive refractive power and includes a convex surface S33 facing the object side and a concave surface S34 facing the image side, wherein both of the convex surface S33 and concave surface S34 are spherical surfaces. The second lens group G32 includes a third lens L33, a fourth lens L34, a fifth lens L35 and a sixth lens L36, all of which are arranged in sequence from the object side to the image side along the optical axis OA3. The third lens L33 is a meniscus lens with negative refractive power and includes a concave surface S36 facing the object side and a convex surface S37 facing the image side, wherein both of the concave surface S36 and convex surface S37 are spherical surfaces. The fourth lens L34 is a biconvex lens with positive refractive power and includes a convex surface S38 facing the object side and a convex surface S39 facing the image side, wherein both of the convex surface S38 and convex surface S39 are spherical surfaces. The fifth lens L35 is a biconcave lens with negative refractive power and includes a concave surface S310 facing the object side and a concave surface S311 facing the image side, wherein both of the concave surface S310 and concave surface S311 are spherical surfaces. The sixth lens L36 is a biconvex lens with positive refractive power and includes a convex surface S312 facing the object side and a convex surface S313 facing the image side, wherein both of the convex surface S312 and convex surface S313 are aspheric surfaces. The fifth lens L35 and the sixth lens L36 move along the optical axis OA3 together when the lens assembly 3 is focusing at close distance.

In order to maintain excellent optical performance of the lens assembly in accordance with the third embodiment of the invention, the lens assembly 3 must satisfies the following four conditions:

$$0.23 \leq f3/TL3 \leq 0.45 \quad (9)$$

$$|f3/f3_1| \leq 1 \quad (10)$$

$$|(f3_2-f3)/f3| \leq 0.093 \quad (11)$$

$$0.04 \leq |f3_2/f3_1| \leq 1 \quad (12)$$

wherein f3 is an effective focal length of the lens assembly 3, TL3 is a distance from the object side surface S31 of the first lens L31 to the image plane IMA3 along the optical axis OA3, $f3_1$ is an effective focal length of the first lens group G31 and $f3_2$ is an effective focal length of the second lens group G32.

By the above design of the lenses and stop ST3, the lens assembly 3 is provided with a shortened total lens length, a reduced F-number, an effective corrected aberration and an increased resolution.

In order to achieve the above purposes and effectively enhance the optical performance, the lens assembly 3 in accordance with the third embodiment of the invention is provided with the optical specifications shown in Table 5, which include the effective focal length, F-number, total lens length, radius of curvature of each lens surface, thickness between adjacent surface, refractive index of each lens and Abbe number of each lens. Table 5 shows that the effective focal length is equal to 14.33 mm, F-number is equal to 2.44 and total lens length is equal to 44.368 mm for the lens assembly 3 of the third embodiment of the invention.

TABLE 5

Effective Focal Length = 14.33 mm
F-number = 2.44
Total Lens Length = 44.368 mm

| Surface Number | Radius of Curvature (mm) | Thickness (mm) | Nd | Vd | Remark |
|---|---|---|---|---|---|
| S31 | 11.000 | 0.8 | 1.46 | 97.9 | The First Lens L31 |
| S32 | 5.426 | 2 | | | |
| S33 | 17.061 | 1.3 | 1.92 | 17.0 | The Second Lens L32 |
| S34 | 21.337 | 2.19 | | | |
| S35 | ∞ | 1.764 | | | Stop ST3 |

TABLE 5-continued

Effective Focal Length = 14.33 mm
F-number = 2.44
Total Lens Length = 44.368 mm

| Surface Number | Radius of Curvature (mm) | Thickness (mm) | Nd | Vd | Remark |
|---|---|---|---|---|---|
| S36 | −10.155 | 2.284 | 1.65 | 30.1 | The Third Lens L33 |
| S37 | −31.649 | 0.3 | | | |
| S38 | 30.558 | 3.9 | 1.76 | 52.7 | The Fourth Lens L34 |
| S39 | −12.31 | 2.1 | | | |
| S310 | −11.299 | 0.8 | 1.6 | 30.3 | The Fifth Lens L35 |
| S311 | 48.167 | 0.3 | | | |
| S312 | 32.933 | 5 | 1.66 | 66.8 | The Sixth Lens L36 |
| S313 | −10.933 | 20.23 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the third embodiment, the conic constant k and the aspheric coefficients A, B, C, D, E of each surface are shown in Table 6.

TABLE 6

| Surface Number | k | A | B | C | D | E |
|---|---|---|---|---|---|---|
| S31 | 0 | 2.233E−04 | −2.869E−06 | 7.623E−08 | 8.122E−10 | 0.00E+00 |
| S32 | 0 | 1.216E−04 | −7.872E−06 | 3.84E−07 | −2.716E−08 | 9.532E−10 |
| S312 | 0 | −1.117E−04 | 7.606E−07 | −7.955E−09 | 5.085E−11 | −4.003E−13 |
| S313 | 0 | 8.558E−05 | 3.527E−07 | 3.814E−09 | 1.524E−11 | −1.939E−14 |

For the lens assembly 3 of the third embodiment, the effective focal length f3 of the lens assembly 3 is equal to 14.33 mm, the distance TL3 from the object side surface S31 of the first lens L31 to the image plane IMA3 along the optical axis OA3 is equal to 44.368 mm, the effective focal length $f3_1$ of the first lens group G31 is equal to −35.03 mm, and the effective focal length $f3_2$ of the second lens group G32 is equal to 14.4 mm. According to the above data, the following values can be obtained:

$$f3/TL3 = 0.32,$$

$$|f3/f3_1| = 0.41,$$

$$|(f3_2-f3)/f3| = 0.005,$$

$$|f3_2/f3_1| = 0.41$$

which respectively satisfy the above conditions (9)-(12).

Figure 6A:
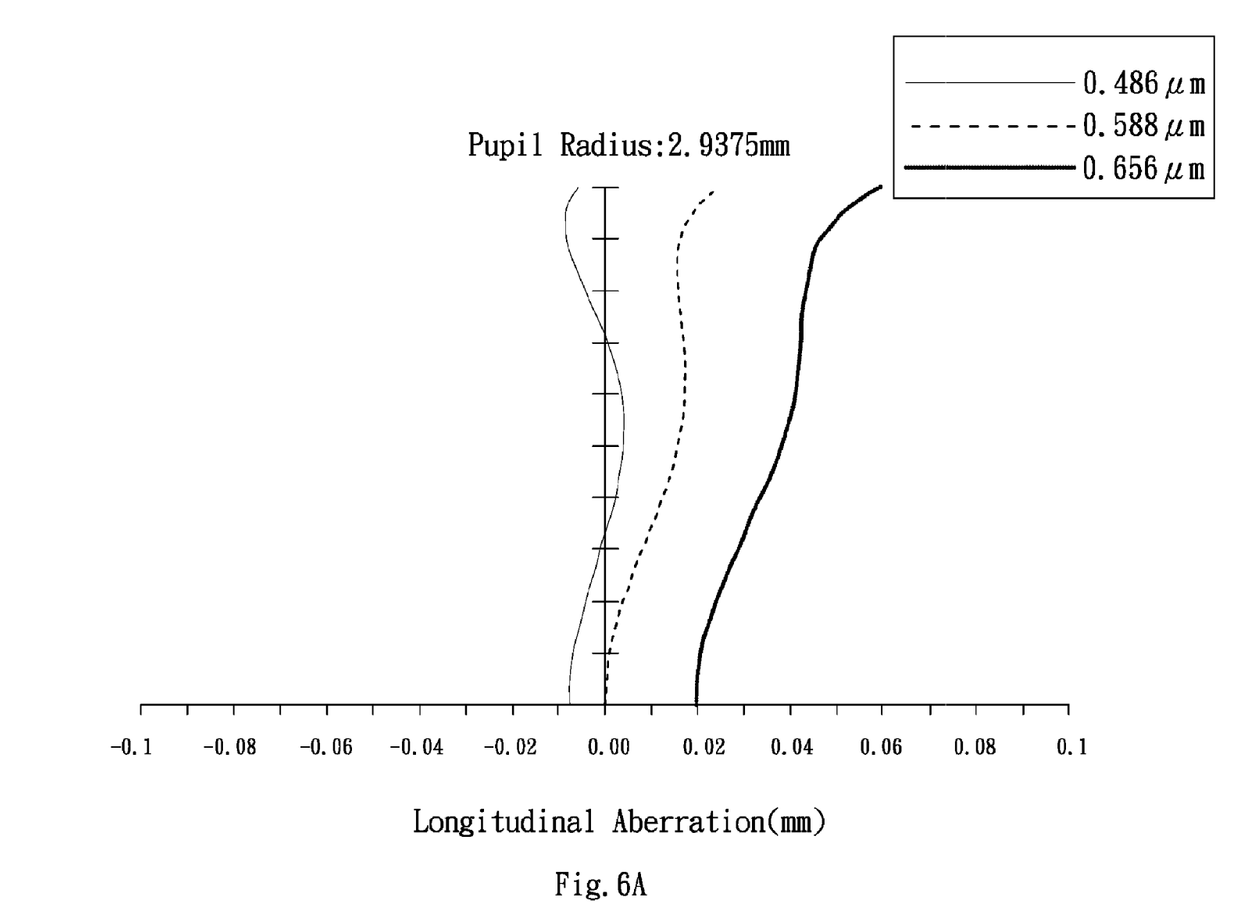
FIG. 6A depicts a longitudinal aberration diagram of the lens assembly in accordance with the third embodiment of the invention.
Figure 6B:
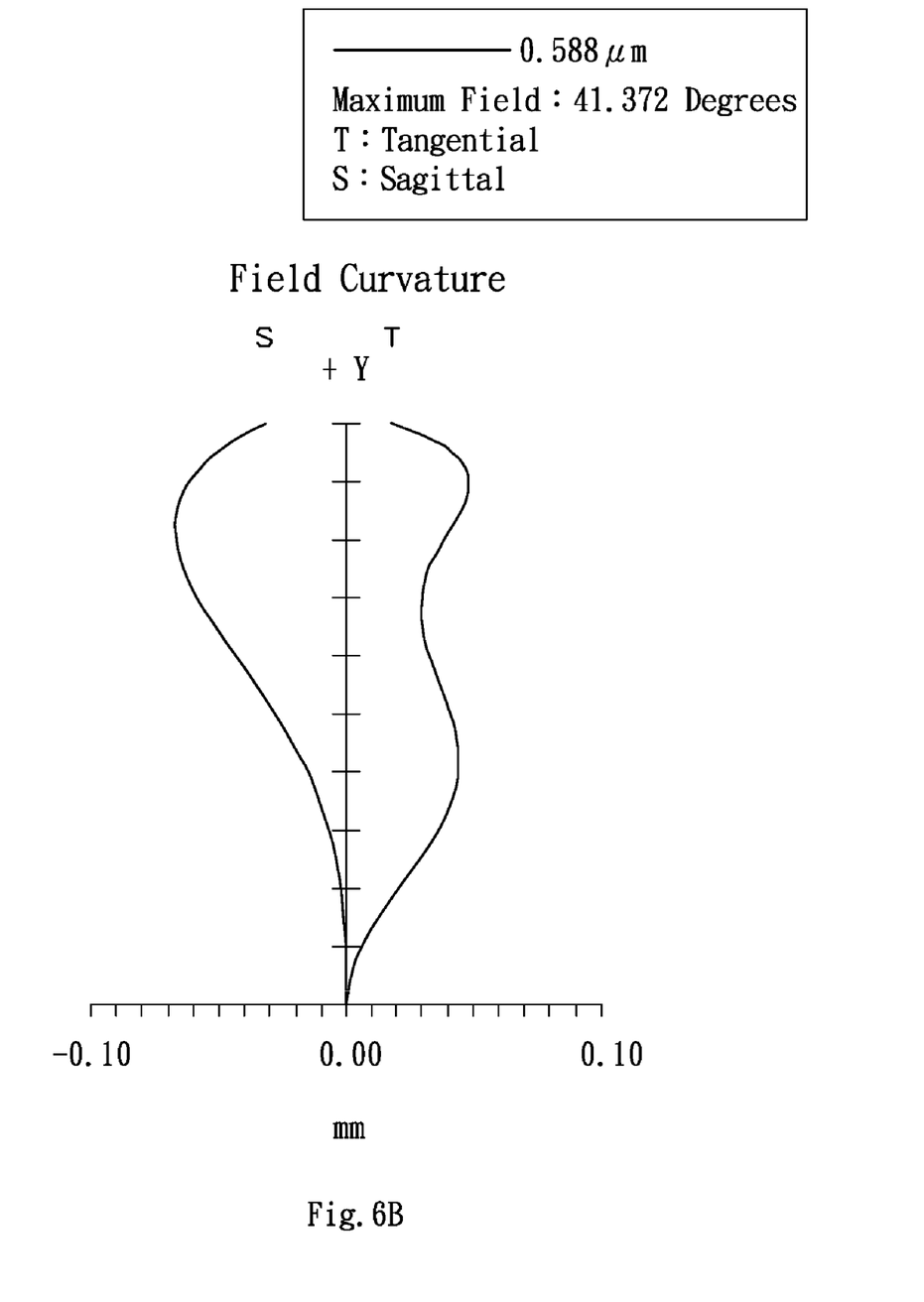
FIG. 6B is a field curvature diagram of the lens assembly in accordance with the third embodiment of the invention.
Figure 6C:
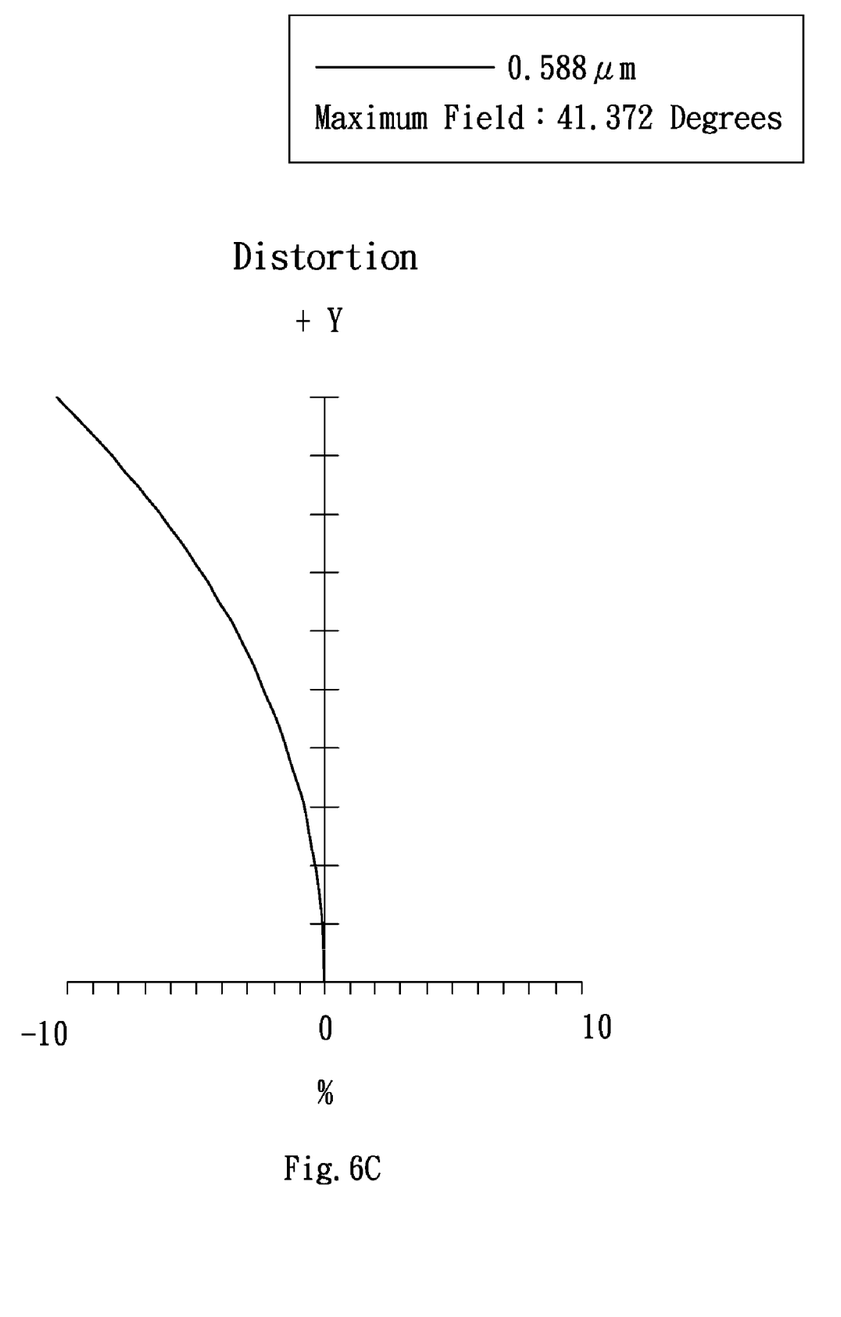
FIG. 6C is a distortion diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a longitudinal aberration diagram of the lens assembly 3 in accordance with the third embodiment of the invention, FIG. 6B shows a field curvature diagram of the lens assembly 3 in accordance with the third embodiment of the invention and FIG. 6C shows a distortion diagram of the lens assembly 3 in accordance with the third embodiment of the invention.

It can be seen from FIG. 6A that the longitudinal aberration in the lens assembly 3 of the third embodiment ranges between −0.01 mm and 0.06 mm for the wavelength of 0.486 μm, 0.588 μm and 0.656 μm. It can be seen from FIG. 6B that the field curvature of tangential direction and sagittal direction in the lens assembly 3 of the third embodiment ranges between −0.07 mm and 0.05 mm for the wavelength of 0.588 μm. It can be seen from FIG. 6C that the distortion in the lens assembly 3 of the third embodiment ranges between −11% and 0% for the wavelength of 0.588 μm. It is obvious that the longitudinal aberration, the field curvature and the distortion of the lens assembly 3 of the third embodiment can be corrected effectively. Therefore, the lens assembly 3 of the third embodiment is capable of good optical performance.

In the above embodiment, the first lens group includes a first lens and a second lens. However, it has the same effect and falls into the scope of the invention that the first lens group is changed to consist of a first lens.

What is claimed is:

1. A lens assembly comprising a first lens group, a stop and a second lens group, all of which are arranged in order from an object side to an image side along an optical axis, wherein:

the first lens group consists of a first lens, wherein the first lens is with negative refractive power;

the second lens group comprises a second lens, a third lens, a fourth lens and a fifth lens, all of which are arranged in order from the object side to the image side along the optical axis, wherein the second lens is with negative refractive power and comprises a concave surface facing the object side, the third lens is with positive refractive power, the fourth lens is with negative refractive power and the fifth lens is with positive refractive power; and the lens assembly satisfies:

$$0.23 \leq f/TL \leq 0.45,$$

$$|(f_2/f)/f| \leq 0.093,$$

wherein f is an effective focal length of the lens assembly, $f_2$ is an effective focal length of the second lens group and TL is a distance from an object side surface of the first lens to an image plane along the optical axis.

2. The lens assembly as claimed in claim 1, wherein the lens assembly satisfies:

$$|f/f_1| \leq 1,$$

wherein f is an effective focal length of the lens assembly and $f_1$ is an effective focal length of the first lens group.

3. The lens assembly as claimed in claim 1, wherein the first lens group and the second lens group satisfy:

$$0.04 \leq |f_2/f_1| \leq 1,$$

wherein $f_1$ is an effective focal length of the first lens group and $f_2$ is an effective focal length of the second lens group.

4. The lens assembly as claimed in claim 1, wherein the first lens is an aspheric lens and the second lens group at least comprises an aspheric lens.

5. The lens assembly as claimed in claim 1, wherein the second lens group moves along the optical axis when the lens assembly is focusing at close distance.

6. The lens assembly as claimed in claim 1, wherein the fourth lens and the fifth lens move along the optical axis together when the lens assembly is focusing at close distance.

* * * * *